United States Patent
Nakayama

(10) Patent No.: US 7,920,534 B2
(45) Date of Patent: Apr. 5, 2011

(54) WIRELESS LAN SETTING SYSTEM IN AN IMAGE FORMING APPARATUS, AND A WIRELESS LAN SETTING METHOD

(75) Inventor: Fumiharu Nakayama, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 767 days.

(21) Appl. No.: 11/867,319

(22) Filed: Oct. 4, 2007

(65) Prior Publication Data

US 2009/0092106 A1 Apr. 9, 2009

(51) Int. Cl.
*H04W 4/00* (2009.01)

(52) U.S. Cl. .......................... 370/338; 370/401; 709/220

(58) Field of Classification Search .......................... None
See application file for complete search history.

(56) References Cited

U.S. PATENT DOCUMENTS

| 7,434,166 | B2* | 10/2008 | Acharya et al. | 715/740 |
| 2005/0036509 | A1* | 2/2005 | Acharya et al. | 370/466 |
| 2005/0148326 | A1* | 7/2005 | Nogawa et al. | 455/420 |
| 2005/0260973 | A1* | 11/2005 | van de Groenendaal | 455/411 |
| 2006/0128360 | A1* | 6/2006 | Hibino | 455/411 |
| 2008/0037786 | A1* | 2/2008 | Park | 380/270 |
| 2008/0151842 | A1* | 6/2008 | Tysowski et al. | 370/338 |

FOREIGN PATENT DOCUMENTS

| JP | 2005-176099 | 6/2005 |
| JP | 2005-176100 | 6/2005 |

* cited by examiner

*Primary Examiner* — Bob A Phunkulh

(74) *Attorney, Agent, or Firm* — Turocy & Watson, LLP

(57) ABSTRACT

A wireless LAN setting system mounted on an image forming apparatus that performs network connection through a wireless LAN and used for performing wireless communication with plural terminals, the wireless LAN setting system including a mode for checking, before setting is performed, existing setting contents (setting items and setting states) presently set. Guide indications are attached to respective setting screens. With the wireless LAN setting system, proper determination is performed and setting operation is correctly performed even if a user (an administrator) does not have professional knowledge.

13 Claims, 15 Drawing Sheets

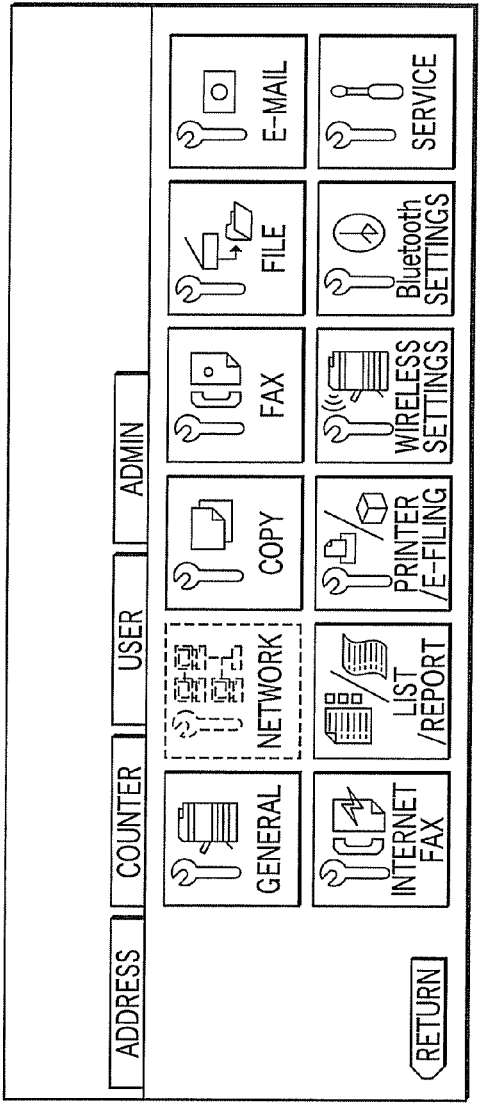
F I G. 4
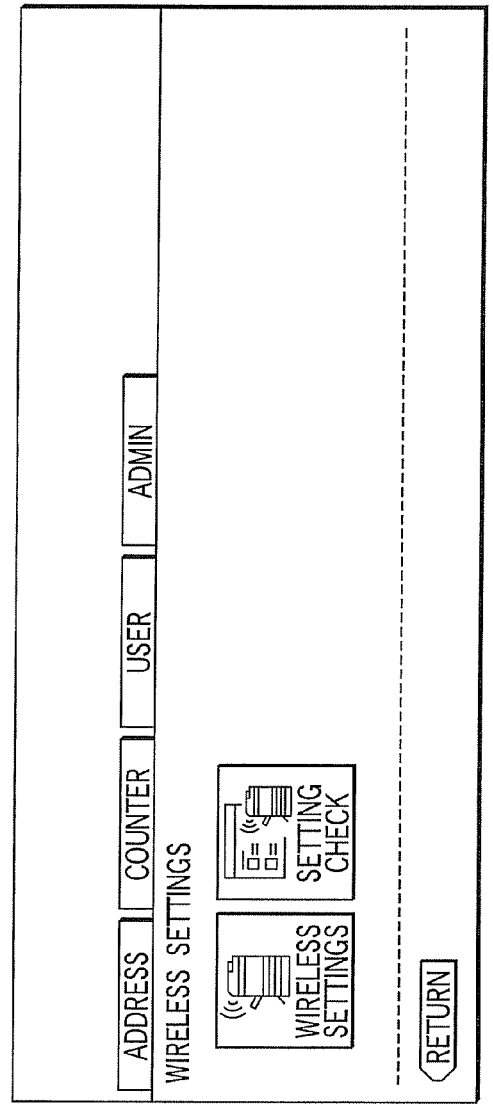
F I G. 5

AVAILABLE NETWORK
▲Select one Access Point listed in the table

| SSID | Wireless Mode | Channel | RSSI |
|---|---|---|---|
| ODInoco | 11 Mbps | 6 | 20 |
| 0007406B0BAC | 54 Mbps | 11 | 13 |
| tec_AR5002b | 54 Mbps | 2 | 30 |
| seiho5 | 11 Mbps | 5 | 12 |

CANCEL   ENTER   1/2   Next

F I G. 12

WIRELESS LAN SECURITY SETTINGS
▲Security function on Access Point must match
SECURITY

| WPA | WPAPSK | WEP | NONE |
| WPA2 | WPA2PSK | 802.Ix | |

WPA/WPA2/802.Ix

CANCEL   PREV.   NEXT

WIRELESS LAN SECURITY SETTINGS
▲Security function on Access Point must match
SECURITY

| WPA | WPAPSK | WEP | NONE |
| WPA2 | WPA2PSK | 802.lx | |

FIG. 15

WIRELESS ENCRYPTION-WEP

WEP ENCRYPTION  [64bit]  [128bit]  [152bit]
KEY FORMAT  [HEX]  [ASCII]
WEP KEY  [*****]

[CANCEL]  [PREV.]  [NEXT]

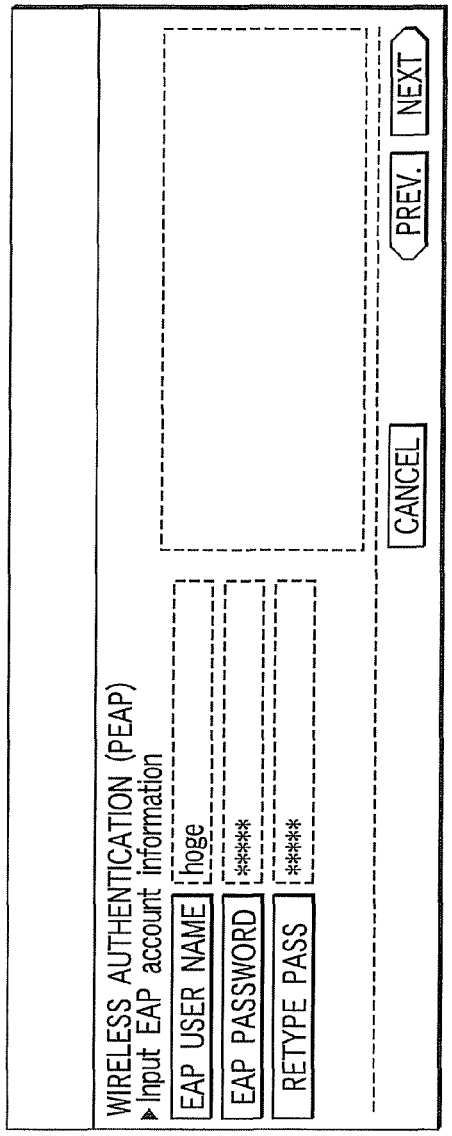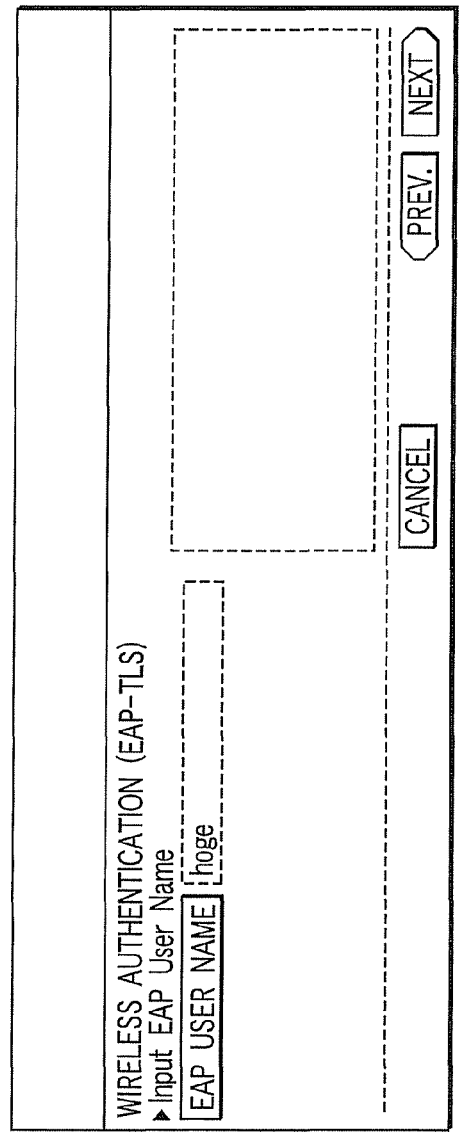
F I G. 18
F I G. 19

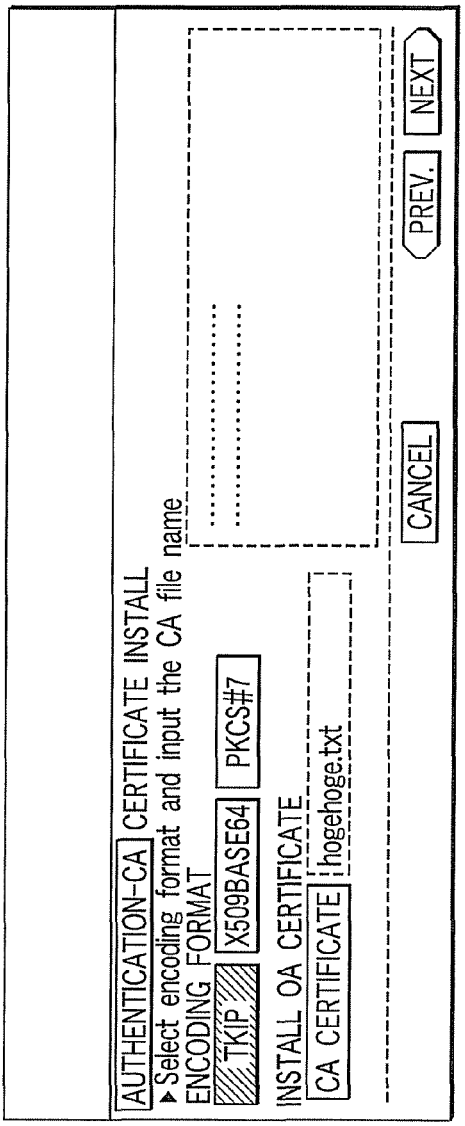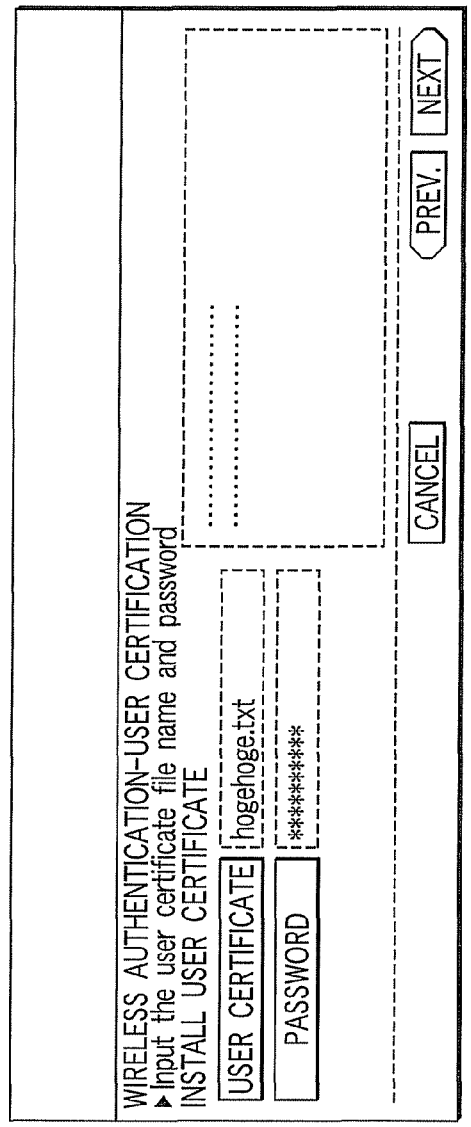
FIG. 20
FIG. 21

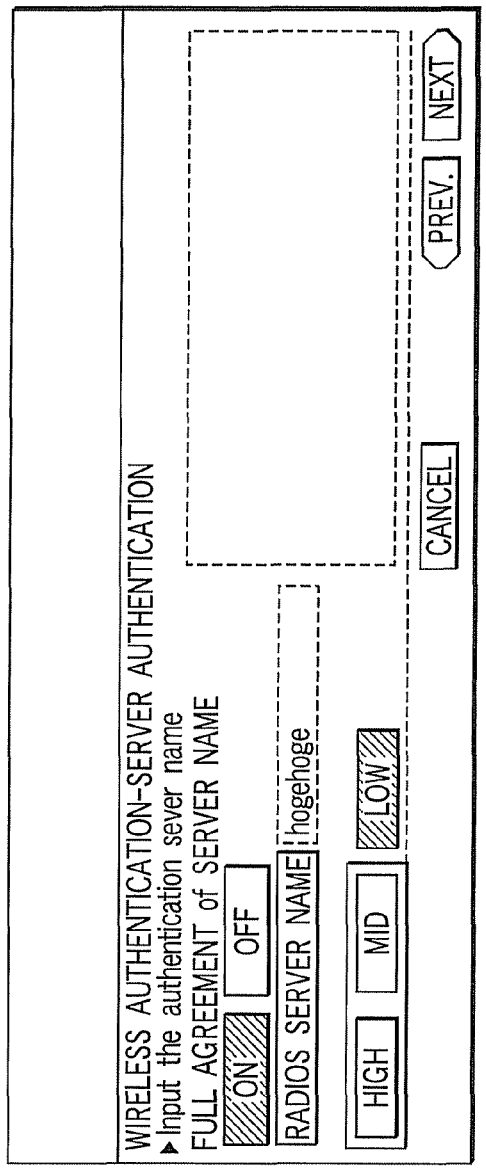
F I G. 22
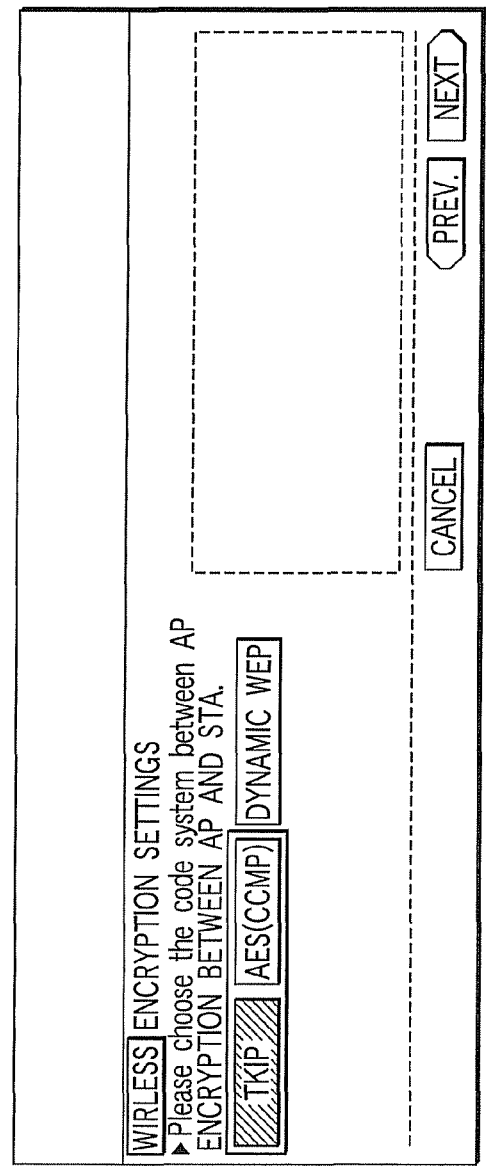
F I G. 23

F I G. 24

F I G. 25

WIRELESS LAN SETTING SYSTEM IN AN IMAGE FORMING APPARATUS, AND A WIRELESS LAN SETTING METHOD

BACKGROUND OF THE INVENTION

1. Field of the Invention

The present invention relates to a user interface for setting a wireless LAN function installed in an image forming apparatus.

2. Description of the Related Art

In recent years, there are an increasing number of users who use a so-called wireless LAN (Local Area Network) for performing communication among plural information terminals in a small area such as in a building and an ordinary house, storing data, and performing wireless communication with a server connected to an external network such as the Internet. In this wireless LAN, it is unnecessary to lay wiring for communication (wire) to the information terminals and, if a wireless function is given to the information terminals, it is possible to perform communication with wireless stations (access points) from free locations in a communication area.

Various settings are applied to these wireless stations such that a protocol for causing the wireless stations to perform communication is established. Setting of security is also important to prevent communication content from leaking to the outside and prevent intrusion from the outside. For example, JP-A-2005-176099 discloses a technique concerning a method of performing necessary setting in order to realize wireless connection.

As settings for a general wireless LAN, a large number of settings such as a setting of an SSID, a setting of an authentication system for security, and a type setting for a security network of a wireless system are performed. In a general personal computer, in most cases, setting is completed by a dealer when a user purchases the personal computer and, for example, setting is performed in accordance with an input guide by a program attached to a communication apparatus or the like. In this input guide, since setting is indicated in detail by pictures and sentences displayed on a screen, a general user can complete the setting if the user performs input as indicated and a setting screen proceeds even when the user does not have the knowledge what is to be inputted. Wrong input is often checked by the program.

Display screens provided in order to display certain limited information of a facsimile, a printer apparatus, and the like in the past have small screen sizes and are originally designed to be used for limited applications. Thus, unlike a screen of a display device of a personal computer, the display screens cannot display various kinds of information. Therefore, on a GUI screen for causing the user to perform setting for the wireless LAN, setting operation by selected display also used for other display items or simplified display is performed. In particular, it is not easy to set necessary setting items concerning respective authentication systems in a short time and properly by determining presence or absence of setting, selection of setting items, and the like unless the user has high degree of background knowledge in advance.

BRIEF SUMMARY OF THE INVENTION

An embodiment according to the present invention provides a wireless LAN setting system mounted on an image forming apparatus with which a user can properly input necessary setting items even if the user does not have high degree of background knowledge.

An embodiment according to the present invention provides a wireless LAN setting system mounted on an image forming apparatus that performs network connection through a wireless LAN and used for performing wireless communication with plural terminals. The wireless LAN setting system has an existing setting check mode for checking, prior to performing wireless LAN setting, contents already set in the image forming apparatus, a network type selection mode for selecting a network used for the wireless communication, an SSID setting mode for establishing a predetermined protocol between the image forming apparatus and the plural terminals in the wireless communication, and a security mode for applying encoding to information to be communicated and performing wireless communication using a selected encryption system.

BRIEF DESCRIPTION OF THE SEVERAL VIEWS OF THE DRAWINGS

FIG. 4 is a diagram showing an example of a setting screen for an administrator in the wireless LAN setting system;

FIG. 5 is a diagram showing an example of a screen for starting setting of a wireless LAN in the wireless LAN setting system;

FIG. 12 is a diagram showing a NETWORK selection screen in the wireless LAN setting system;

FIG. 13 is a diagram showing a security mode setting screen in the wireless LAN setting system;

FIG. 14 is a diagram showing an example of a security setting screen at the time when an old wireless LAN module is mounted on the wireless LAN setting system;

FIG. 15 is a diagram showing a WEP encryption screen in the wireless LAN setting system;

FIG. 18 is a diagram showing an EAP account information input screen in the wireless LAN setting system;

FIG. 19 is a diagram showing an EAP user name input screen in the wireless LAN setting system;

FIG. 20 is a diagram showing a CA certificate setting screen in the wireless LAN setting system;

FIG. 21 is a diagram showing a user certification setting screen in the wireless LAN setting system;

FIG. 22 is a diagram showing a server authentication information input screen in the wireless LAN setting system;

FIG. 23 is a diagram showing a selection screen for an encryption system between an AP and an STA in the wireless LAN setting system;

FIG. 24 is a diagram showing a setting screen for transmission power and a transmission rate in the wireless LAN setting system;

FIG. 25 is a diagram showing a transmission power setting screen in the wireless LAN setting system;

DETAILED DESCRIPTION OF THE INVENTION

An embodiment of the present invention will be hereinafter explained in detail with reference to the drawings.

Figure 1:
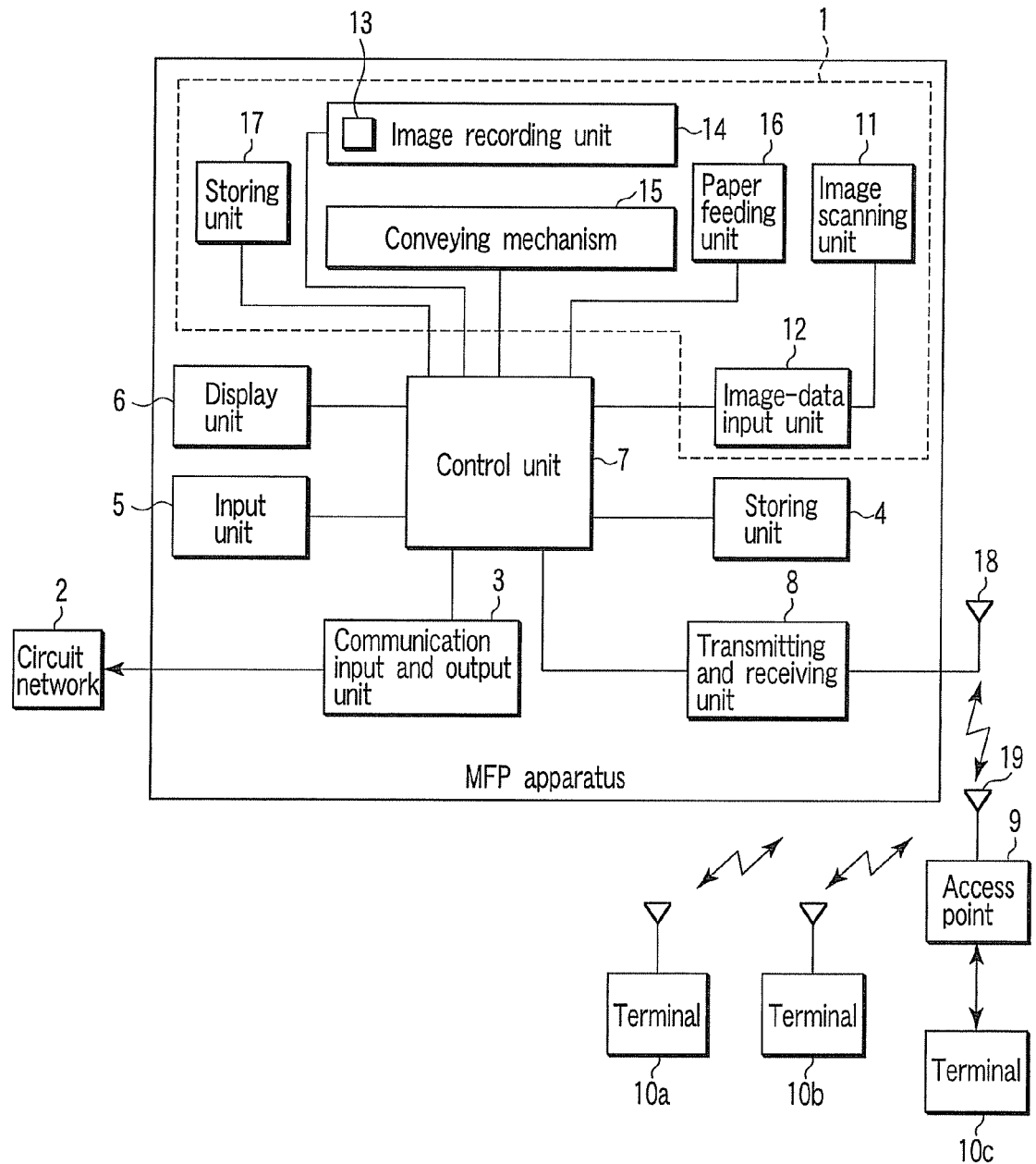
FIG. 1 is a diagram conceptually showing an example of the structure of a wireless LAN setting system mounted on an image forming apparatus according to an embodiment of the present invention.

FIG. 1 is a diagram conceptually showing an example of the structure of a wireless LAN setting system mounted on an image forming apparatus according to this embodiment, for example, an MFP (Multi-Function Peripheral) apparatus that has all of a copy function, a facsimile function, and a printer function. This MFP apparatus has all of the copy function, the facsimile function, and the printer function and can be connected to the Internet and a wireless LAN.

A system configuration according to this embodiment is constituted by an image forming unit 1 that forms images, characters, and the like on a recording medium such as recording paper, a communication input and output unit 3 connected to a network (including a telephone line and an optical cable line) 2, a storing unit 4 that stores image data, various kinds of setting information, and programs for operations and control, an input unit 5 that inputs a setting registration and an indication by a user, a display unit 6 that displays setting items and processing states, a control unit 7 that controls the entire system, a transmitting and receiving unit 8 for performing wireless communication or optical communication, a wireless access point 9 such as a wireless router connected to the transmitting and receiving unit 8 and set on the outside, and plural terminals 10a to 10c that the user uses.

The image forming unit 1 is constituted by an image scanning unit 11 that optically scans photographs, pictures, characters, and the like formed on a paper surface and the like, an image-data input unit 12 that captures image data inputted from the outside or image data scanned by the image scanning unit 11, an image forming unit 14 that includes a laser unit 13 for irradiating a laser beam on a not-shown photoconductive drum and forms (records) an image on recording paper, a conveying mechanism 15 that conveys the recording paper, a paper feeding unit 16 that stores unrecorded recording paper and feeds the paper to the conveying mechanism 15, and a storing unit (a sorter) 17 that stores recording paper having an image recorded thereon.

The storing unit 4 is constituted by, for example, a volatile memory such as a RAM and a nonvolatile memory such as a ROM and has a setting program for performing wireless LAN setting stored therein. Setting screen information displayed on the display unit 6 during setting is also included in this setting program. Besides, a storing unit may be constituted by a hard disk, a flash memory, and the like. As plural terminals used by the user, for example, personal computers or peripheral apparatuses such as MFP apparatuses are assumed. It goes without saying that it is possible to apply this embodiment to wireless communication among the MFP apparatuses.

In this embodiment, an example by wireless communication performed by using the wireless access point 9 is explained. As other communication means, it is also possible to use optical communication depending on an ambient environment in which the wireless access point 9 is set.

Figure 2:
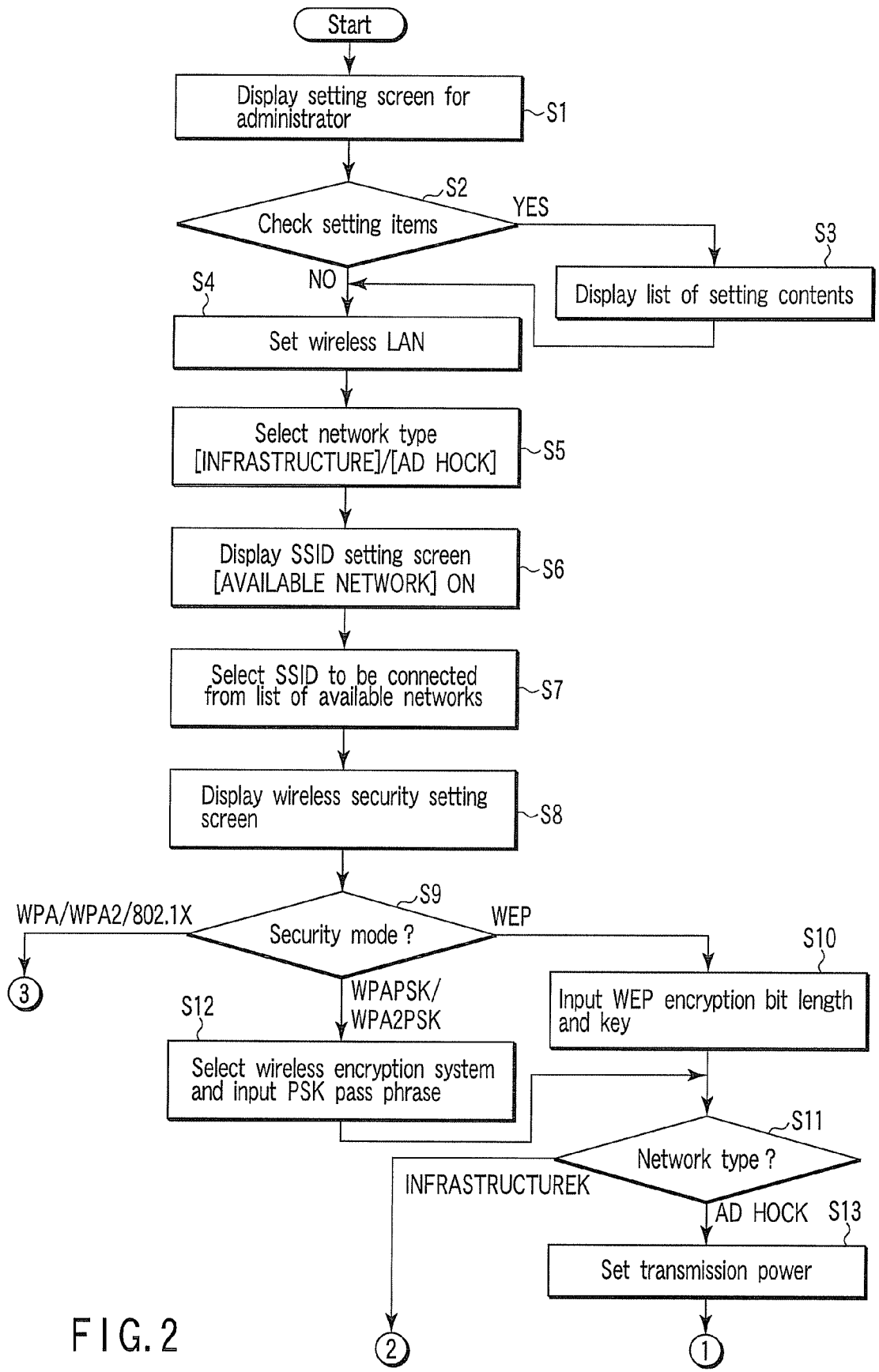
FIG. 2 is a former half of a flowchart for explaining setting operation in the wireless LAN setting system according to the embodiment.
Figure 3:
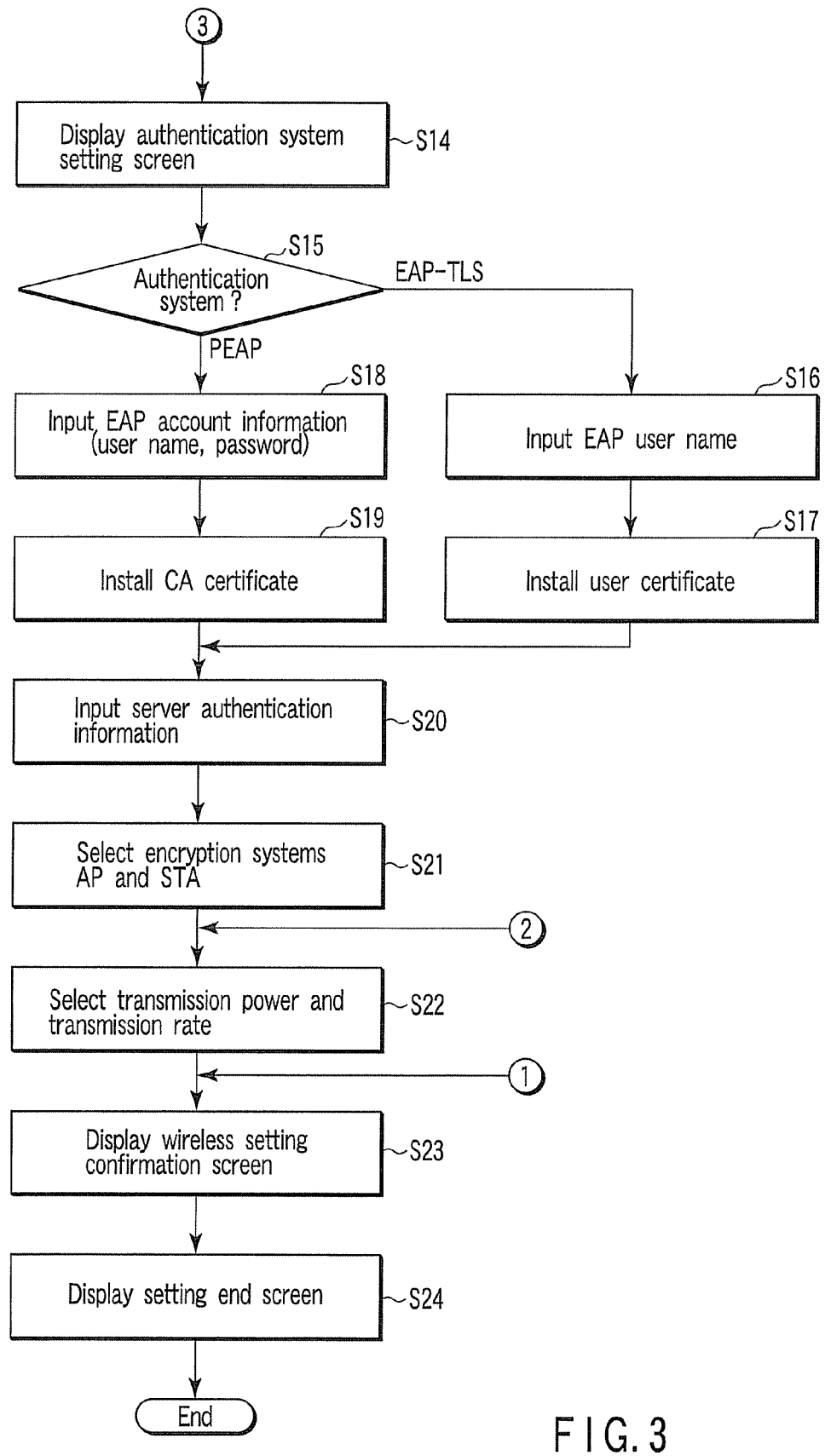
FIG. 3 is a latter half of the flowchart for explaining setting operation in the wireless LAN setting system according to the embodiment.

Setting operation in the wireless LAN setting system according to this embodiment is explained with reference to a flowchart shown in FIG. 2 and FIG. 3 and examples of setting screens shown in FIG. 4 to FIG. 27. These setting screens are examples of screens displayed on the display unit 6 that has a touch panel function as a part of the input unit. It goes without saying that, as input means, an input unit formed by a panel and a keyboard in which switches are arranged may be adopted besides the touch panel.

First, a setting screen for an administrator shown in FIG. 4 is displayed from a menu screen (step S1). This screen is a screen that a permitted person can operate and invocation of which is limited by an ID and the like. On this setting screen for an administrator, various selection buttons, i.e., "GENERAL", "COPY", "FAX", "FILE", "E-MAIL", "INTERNET FAX", "LIST/REPORT", "PRINTER/E-FILING", "WIRELESS SETTINGS", "BLUETOOTH SETTINGS", "SERVICE", and "RETURN" are displayed. When the user touches the "WIRELESS SETTINGS" button, a screen for starting setting of a wireless LAN shown in FIG. 5 is displayed. When a wireless LAN device is not mounted on this image forming apparatus or when the wireless LAN device is not connected to the image forming apparatus, a "WIRELESS SETTING" portion is dimly displayed.

In this wireless LAN setting start screen, the "WIRELESS SETTING" button and the "SETTING CHECK" button are displayed. When the user checks contents presently set (setting items and setting states) (step 2), the user touches the "SETTING CHECK" button (YES). On the other hand, when the user performs new setting or setting change (NO), the user touches the "SETTING CHECK" button.

Figure 7:
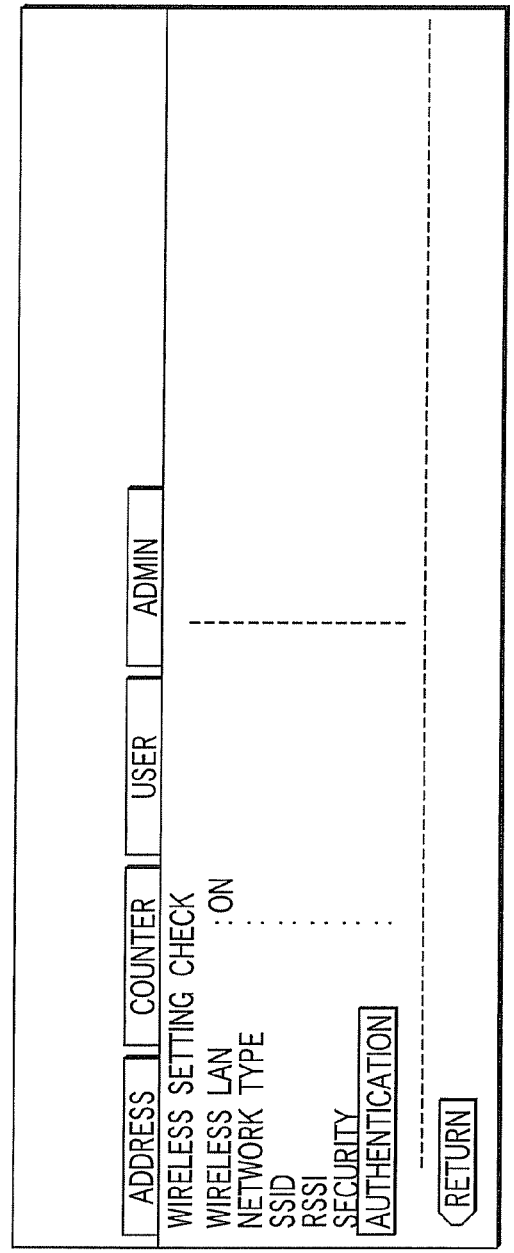
FIG. 7 is a diagram showing a present setting content list screen in the wireless LAN setting system.
Figure 8:
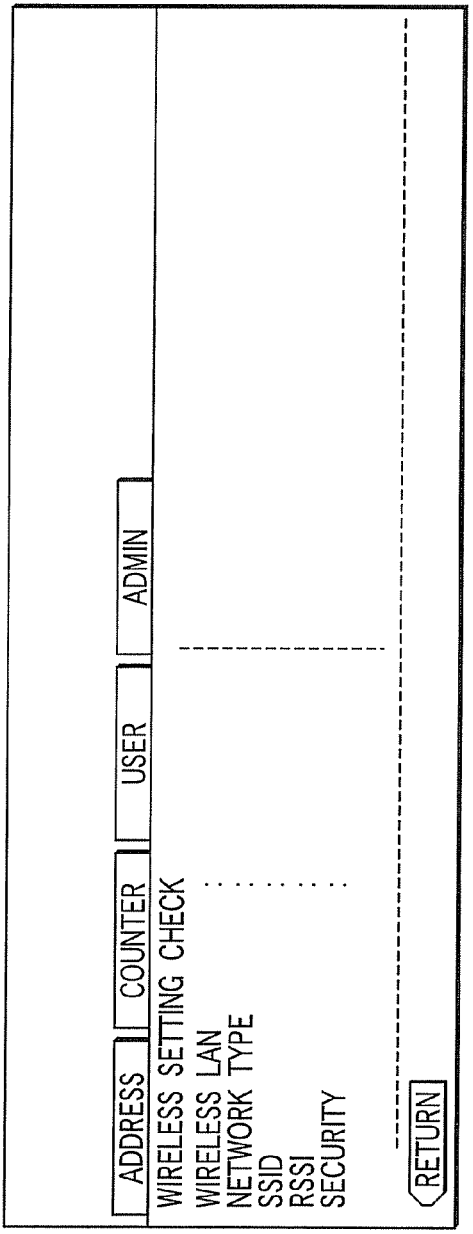
FIG. 8 is a diagram showing a present setting content list screen in the wireless LAN setting system.
Figure 9:
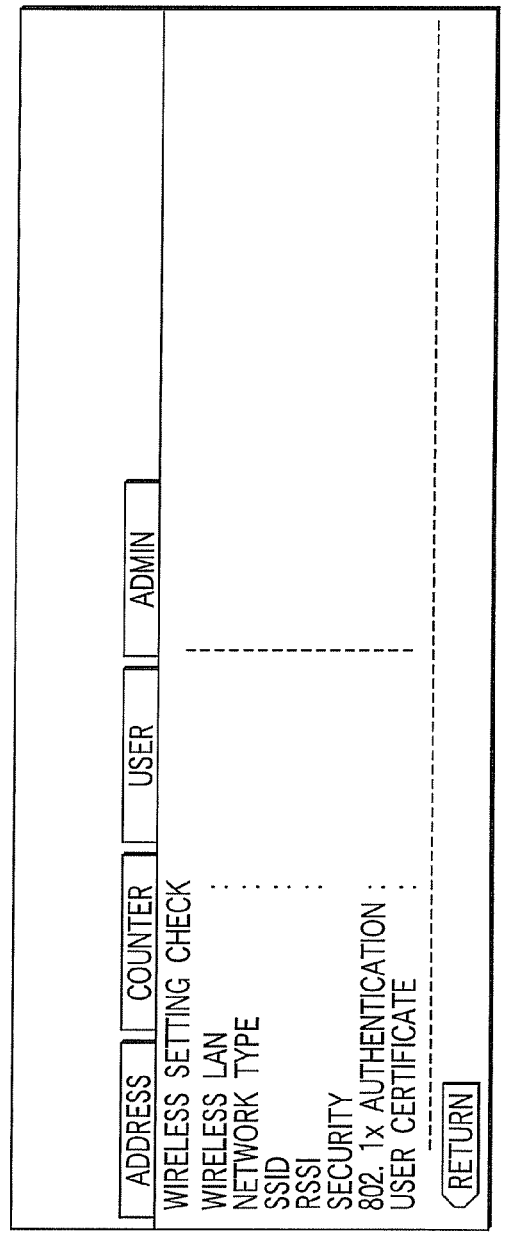
FIG. 9 is a diagram showing a present setting content list screen in the wireless LAN setting system.

When the user selects the "SETTING CHECK" button, the wireless LAN setting system enters an existing setting check mode (step S3) in which setting content lists shown in FIG. 7 to FIG. 9 are displayed in order. In these drawings, when the user individually touches setting items, more detailed contents are displayed. In this existing setting check mode, at least setting states such as a type of a security network in which wireless LAN communication is used, an authentication notation of an SSID (RSSID), whether security is used, a type of information encryption used for security, transmission power, and a transmission rate are displayed.

Figure 6:
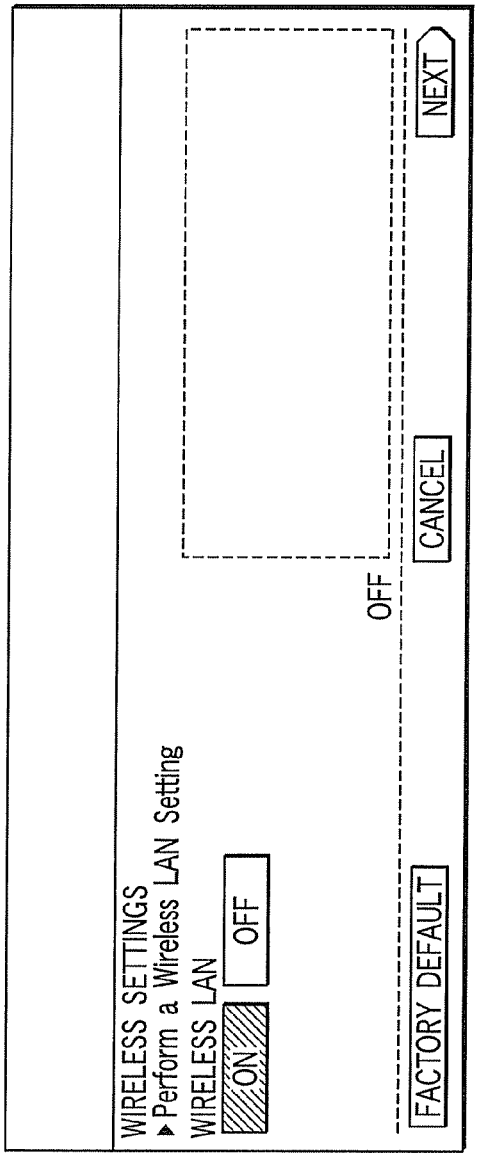
FIG. 6 is a diagram showing an example of a setting screen for checking use of the wireless LAN in the wireless LAN setting system.

When the user touches the "WIRELESS SETTINGS" button, a setting screen [Guide Indication: Perform a Wireless LAN Setting] for confirmation of use of the wireless LAN shown in FIG. 6 is displayed (step S4). On this screen, "ON" and "OFF" are displayed.

When the user touches "ON", the use of the wireless LAN is selected. When the user touches "OFF", the nonuse of the wireless LAN is selected. The selection of use and nonuse is provided for the purpose of stopping, when the wireless LAN is used, the wireless LAN if, for example, other apparatuses are adversely affected by wireless transmission. Therefore, the selection is used when, for example, the use of the wireless LAN is temporarily stopped. When the user touches "OFF", a section of "NEXT" on the lower right of the screen is dimly displayed. Thereafter, after performing predetermined wireless LAN stop processing, the wireless LAN setting system shifts to, for example, a setting confirmation screen [Guide Indication: Please confirm the wireless setting] for the wireless LAN in FIG. 26. Besides, considering that the setting is completed, the wireless LAN setting system may shift to the menu screen usually used.

Figure 10:
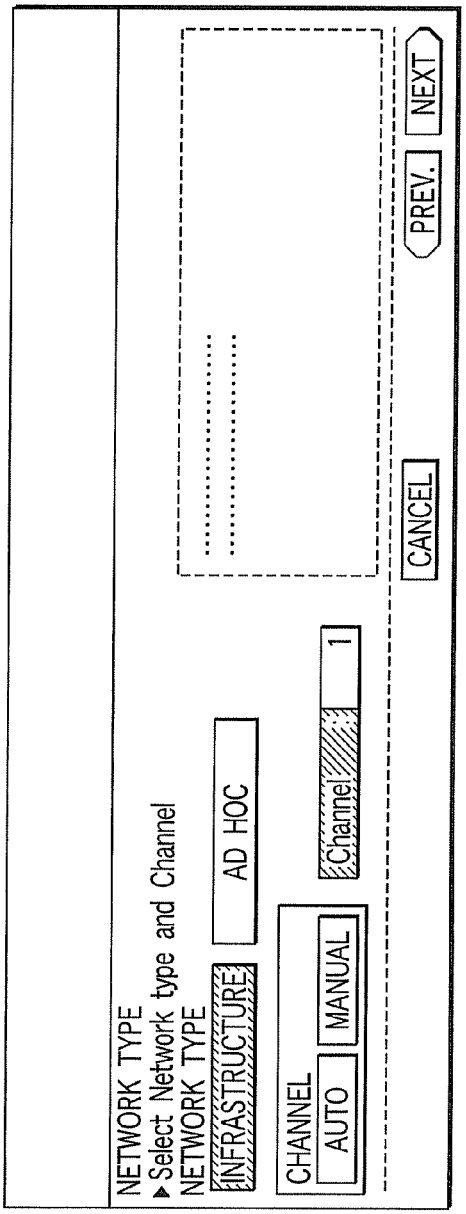
FIG. 10 is a diagram showing a network type selection screen in the wireless LAN setting system.

When the user touches "ON", "NEXT" is displayed on the lower right of the screen. When the user touches this "NEXT" button, a network type selection screen [Guide Indication: Select Network type and Channel" shown in FIG. 10 is displayed and the wireless LAN setting system shifts to a network type selection mode (step S5). On this network type selection screen, an "INFRASTRUCTURE" button and an "AD HOC" button are displayed. When the user touches the "INFRASTRUCTURE" button, a basic setting decided in advance is performed and "CHANNEL" is dimply displayed. On the other hand, when the user touches the "AD HOC" button, an individual setting for directly performing communication with terminals not through the access point 9 is selected. In the "CHANNEL" display, an "AUTO" button and a "MANUAL" button are displayed. Near these buttons, a "Channel" setting button for setting a channel number to be selected is displayed.

When the user touches the "AUTO" button in the "CHANNEL" display, a channel of an AD HOC terminal already present is selected. During this setting of "AUTO", operation of the "Channel" setting button is not accepted. Even when a channel is selected once, a setting to that point is released by touching a "CANCEL" button and the screen can be returned to the original state. When this setting of a network type is completed, the user touches the "NEXT" button and the wireless LAN setting system shifts to the next SSID (Service Set ID) setting mode (step S6). The SSID also includes an ESSID for extending a network identifier.

Figure 11:
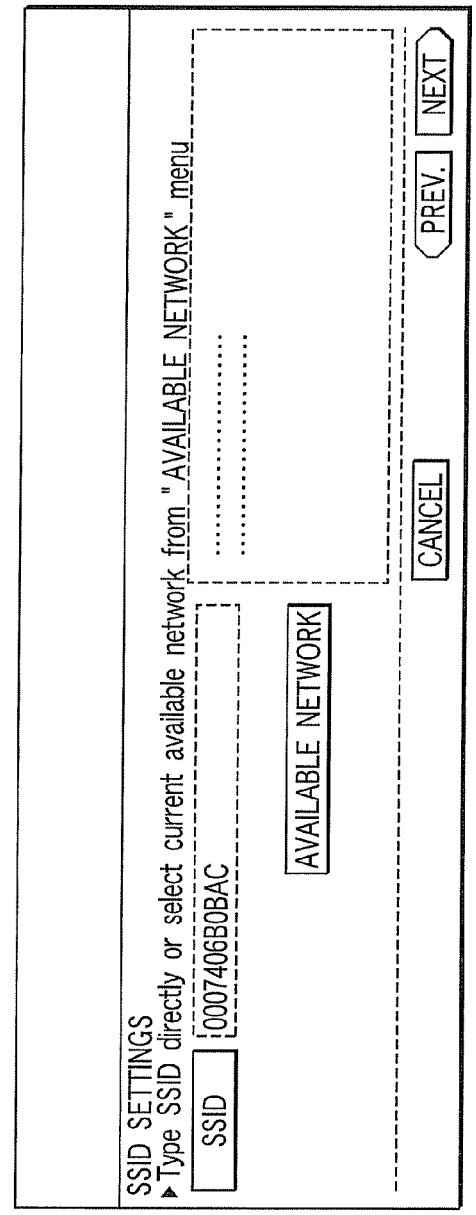
FIG. 11 is a diagram showing an SSID setting screen in the wireless LAN setting system.

FIG. 11 is an example of display of an SSID setting screen [Guide Indication: Type SSID directly or current available network from "AVAILABLE NETWORK" menu]. This SSID is set in order to prevent crosstalk during wireless communication between plural terminals and an access point. In this SSID setting screen, the same ID is set for a terminal that performs communication and the access point 9 that is connected to an apparatus main body. In the SSID setting in this embodiment, the user touches an "AVAILABLE NETWORK" button displayed in the SSID setting screen. A NETWORK selection screen [Guide Indication: Select one Access] shown in FIG. 12 is displayed by this touch. In this screen, a list of wireless networks presently in use is displayed as a table. In this example, besides "SSID", "Wireless Mode", "Channel", and "RSSI" are displayed in the table. When a wireless network to which the user desires to make connection is present in this table, the user can select the network from the list. In this example, the table is scrolled to select "0007406B0BAC" as an SSID. When this SSID is selected, the user touches an "ENTER" button. The screen returns to the SSID setting screen shown in FIG. 11 according to this touch. After confirming the set SSID, the user touches the "NEXT" button to complete the setting (step S7). A security mode setting screen [Guide Indication: Security function on Access must match] shown in FIG. 13 is displayed by this touch (step S8). As shown in FIG. 14, "WPA", "WPA2", and "WPA2PSK" buttons are dimly displayed when the old wireless LAN module is mounted.

In this embodiment, six function modes, i.e., "WPA and WPA2", "WPAPSK, WPAPSK2, and (IEEE)802.1X", and "WEP" are displayed as encryption systems that can be used in the security mode. A mode is selected out of these function modes (step S9). In an example explained here, the respective modes are classified into three groups. In the mode selection, at least one mode is selected.

In this mode selection, when "WEP" is selected, a WEP encryption screen shown in FIG. 15 is displayed. In this WEP encryption screen, setting buttons for a WEP encryption bit length and a WEP key are displayed. When the user appropriately selects and touches these setting buttons, the setting is completed (step S10). After the setting is completed, the user touches the "NEXT" button. In this example, "64 bit" is selected as the WEP encryption bit length, "ASCII" is selected as a key format, and a WEP key of several digits is inputted and set.

Figures 24, 25:
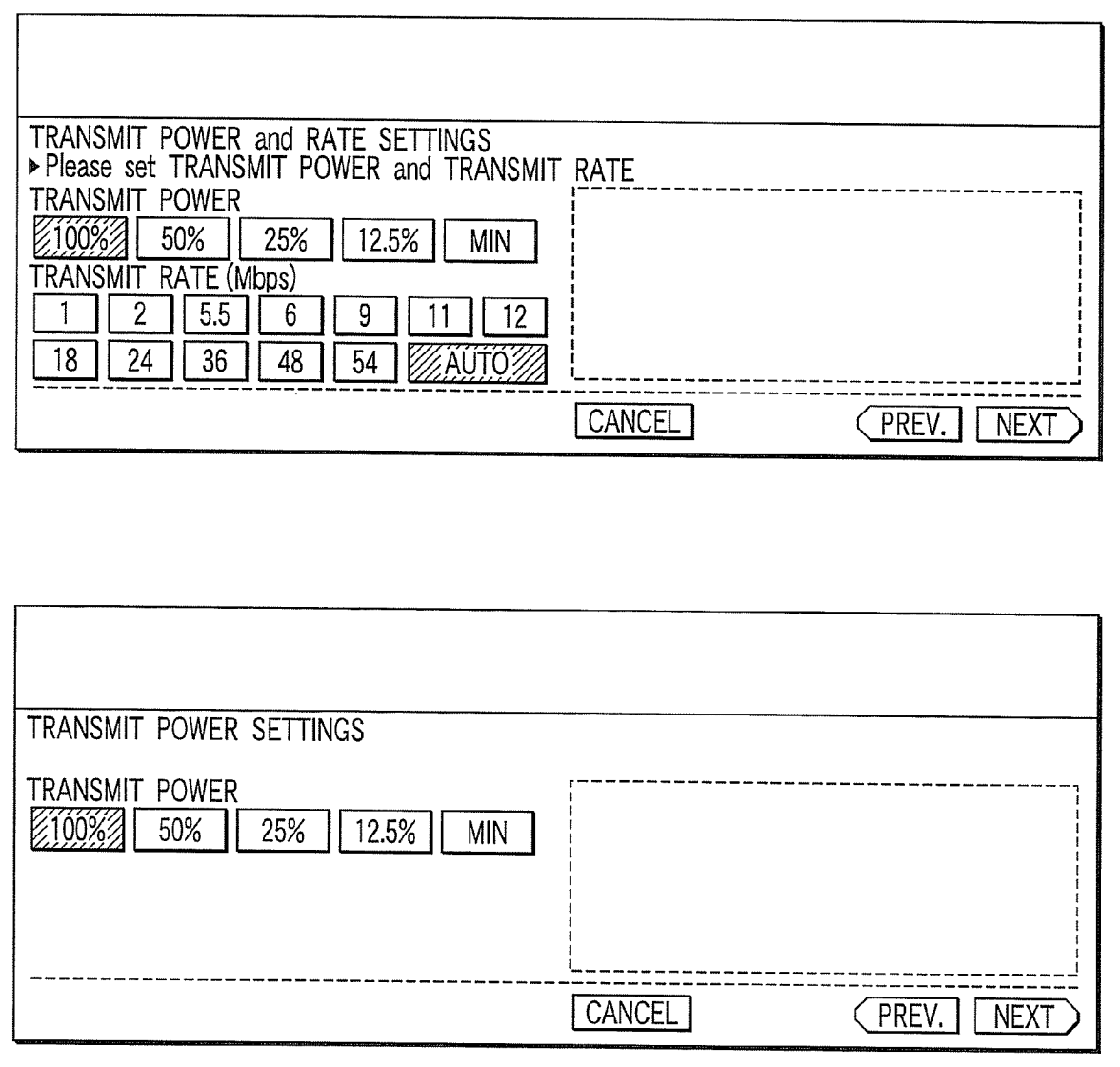

Next, when the WEP encryption setting is finished, the wireless LAN setting system determines whether a network type already set is "INFRASTRUCTURE" or "AD HOC" (step S11). When the type is set as "AD HOC" in this determination, a transmission power setting screen shown in FIG. 25 is displayed (step S13). In this example, it is possible to select 100% (a maximum value), 50%, 25%, 12.5%, and MIN (a minimum value) with respect to an output value of design specifications. In this example, 100% is selected. When this transmission power setting is finished, the wireless LAN setting system shifts to step S23 (a wireless setting confirmation screen) described later. When the type is set in "INFRASTRUCTURE", the wireless LAN setting system shifts to step S22 (selection processing for transmission power and a transmission rate) described later.

Figure 17:
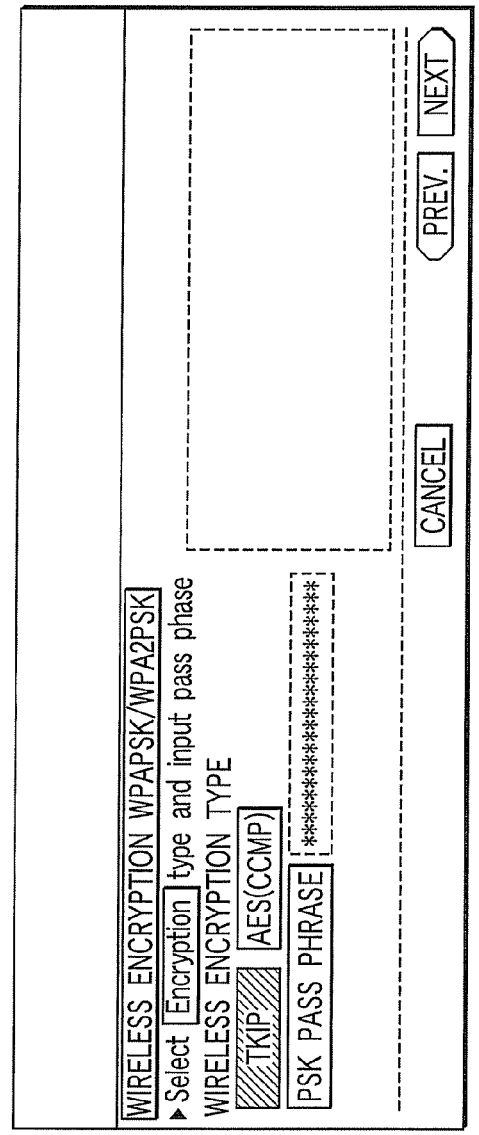
FIG. 17 is a diagram showing a WPA and WPA2 encryption screen in the wireless LAN setting system.

When any one of the function modes "WPA and WPA2" shown in FIG. 13 is selected in step S9, a WPA and WPA2 encryption screen [Guide Indication: Select Encryption type and input pass phrase] shown in FIG. 17 is displayed. In this encryption screen, "TKIP" and "AES(CCMP)" are presented as an example. When the user selects "TKIP" as a wireless encryption system, a different key is given to each packet. Thereafter, the wireless LAN setting system sets a pass phrase for the access point 9 and shifts to the determination of a network type in step S11 described above. The AES is an encryption system of the next generation that replaces the present DES and 3DES. In the same manner, the wireless LAN setting system sets a pass phrase for the access point 9 and shifts to step S11 described above.

Figure 16:
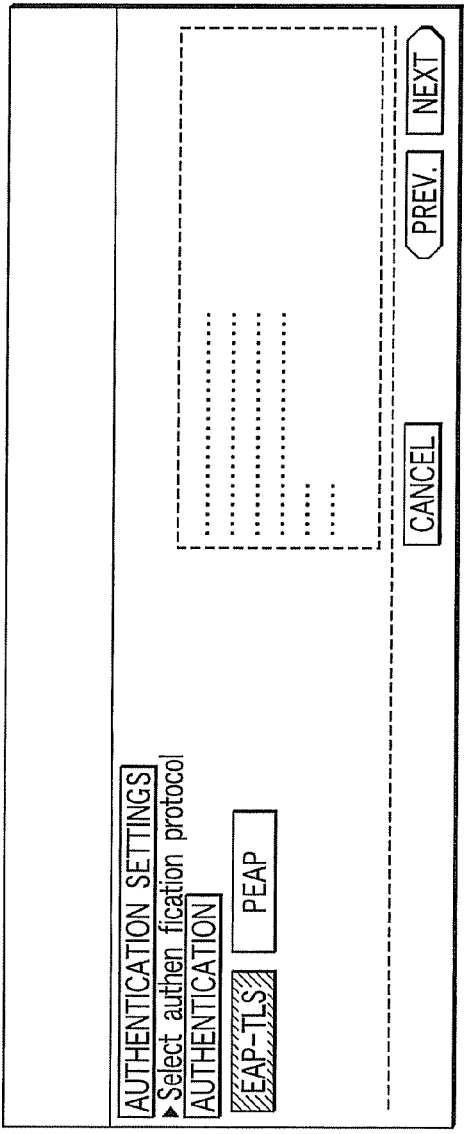
FIG. 16 is a diagram showing an authentication system setting screen in the wireless LAN setting system.

Moreover, when any one of the function modes "WPAPSK, WPAPSK2, and 802.1X" shown in FIG. 13 is selected in step S9, an authentication system setting screen [Guide Indication: Select authentication protocol] shown in FIG. 16 is displayed (step S14). In an example of this authentication screen, two authentication systems, i.e., "ELT-TLS" and "PEAP" are displayed. The user touches an "ELT-TLS" button to reverse-display and selects the authentication system "ELT-TLS". Thereafter, when the user touches the "NEXT" button, an EAP user name input screen [Guide Indication: Input EAP user name] shown in FIG. 19 is displayed (step S16). At this point, a keyboard may be displayed on the display screen to allow the user to input an EAP user name with key input. In this input screen, "hoge . . . " is inputted as an example.

After the input of the user name, when the user touches the "NEXT" button, a user certificate setting screen [Guide Indication: Input the user certificate file name and password] shown in FIG. 21 is displayed (step S17). In this setting screen, the EAP user name "hogehoge.txt" inputted on the last screen and a password setting space are displayed. The user inputs an arbitrary password in the password setting space and determines the password. After this determination, when the user touches the "NEXT" button, the wireless LAN setting system shifts to server authentication information input processing described later.

When the user touches the "PEAP" button in the authentication system in step S15, an EAP account information input screen [Guide Indication: Input EAP account information] shown in FIG. 18 is displayed (step S18). In this input screen, the user inputs arbitrary numbers or words in "EAP USER NAME", "EAP PASSWORD", and "RETYPE PASS", respectively, and determines the numbers or the words. After determining these kinds of information, when the user touches the "NEXT" button, a CA certificate setting screen [Guide Indication: Select encoding format and input the CA file name] shown in FIG. 20 is displayed (step S19). With this screen, the user performs selection in "ENCODING FORMAT" and input setting for "INSTALL CA CERTIFICATE]. In this example, "X509DER" is selected as [ENCODING FORMAT] and "hogehoge.txt" is inputted in [INSTALL CA CERTIFICATE]. When a format of [ENCODING FORMAT] is unselected and nothing is inputted in [INSTALL CA CERTIFICATE], "Dim" is displayed in the section of "NEXT".

Next, when the user touches the "NEXT" button, a server authentication information input screen [Guide Indication: Input the authentication sever name] shown in FIG. 22 is displayed (step S20). When the user selects an "ON" button in [FULL AGREEMENT of SEVER NAME] in this screen, the wireless LAN setting system checks whether an inputted RADIUS server name is a server name registered in a server authentication file. When the user selects a "NO" button, the RADIUS server name is dimply displayed. The user selects any one of encryption intensities divided into three stages. When "PEAP" shown in FIG. 16 is selected, "Dim" is displayed in the encryption intensities.

Next, when the user touches the "NEXT" button in FIG. 22, a selection screen for encryption systems AP and STA [Guide Indication: Please choose the code system between AP] shown in FIG. 23 is displayed (step S21). In an example of this selection screen, a "TKIP" button, an "AES(CCMP)" button, and a "Dynamic WEP" button are displayed. When the "TKIP" button is selected, a different key is given to each packet simultaneously with complete check of a message. When the "AES(CCMP)" button is selected, AES encryption as the encryption system in the next generation described above is selected. Moreover, when the "Dynamic WEP" button is selected, Dynamic WEP encryption is selected. In Dynamic WEP, a WEP key, which is dynamically converted, is given to each interval determined.

Next, when the user touches the "NEXT" button in FIG. 23, a setting screen for transmission power and a transmission rate [Guide Indication: Please set TRANSMIT POWER and TRANSMIT RATE] shown in FIG. 24 is displayed (step S22). In this setting screen, in [TRANSMIT POWER], it is possible to select 100% (a maximum value), 50%, 25%, 12.5%, and MIN (a minimum value) with respect to an output value of design specifications. In this example, 100% is selected. In [TRANSMIT RATE], the user sets a transmission data volume for information to be wirelessly communicated. Here, the user can select and set an arbitrary fixed rate and an arbitrary automatic rate. When the automatic rate is selected, an appropriate rate is used in accordance with a communication state. After the setting is finished, the user touches the "NEXT"button.

Figures 26, 27:
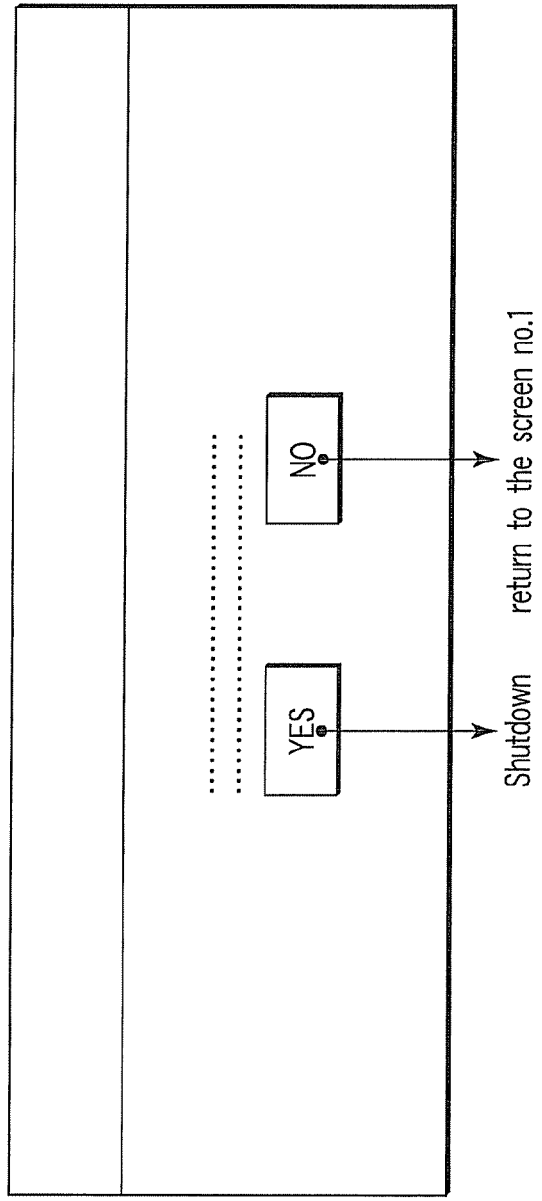
FIG. 26 is a diagram showing a wireless LAN setting confirmation screen in the wireless LAN setting system.
FIG. 27 is a diagram showing an end screen in the wireless LAN setting system.

Next, the wireless LAN setting system displays a wireless setting confirmation screen [Guide Indication: Please set TRANSMIT POWER and TRANSMIT RATE] shown in FIG. 26 (step S23). In this confirmation screen, setting states of the respective setting items are displayed. When the user touches a "FINISH" button, a series of setting operation is finished and an end screen shown in FIG. 27 is displayed. When the user desires to correct the settings, if the user touches a "PREV" button, the settings performed so far are displayed so as to be traced back.

In the end screen shown in FIG. 27, a "YES" button and a "NO" button are displayed (step S24). When the user selects the "NO" button, the screen returns to the setting screen for an administrator shown in FIG. 4. When the user selects the "YES" button, the setting operation in the wireless LAN setting system is completed and the setting screen changes to the usual menu screen. According to the setting operation described above, the setting for the wireless LAN in the MFP apparatus is finished.

As described above, the setting for the wireless LAN mounted on the MFP apparatus in the past targets users (administrators) having professional knowledge. Thus, a situation occurs in which, for a user who does not grasp setting contents, it is difficult to determine whether selection and setting of setting items are essential or it is impossible to set setting items. Even if the setting is completed, when wrong setting is made, a situation occurs in which it is impossible to find out which part of the setting is the wrong setting.

On the other hand, in the embodiment of the present invention, since the wireless LAN setting system has the mode for first checking, before setting, existing setting contents (setting items and setting states) presently set, it is possible to determine whether the setting is necessary. Since the guide indications are attached in necessary parts in the respective setting screens, even a user (an administrator) who does not have professional knowledge can perform proper determination and correctly perform setting operation. The guide indications in this embodiment are only examples. It is also easy to represent the guide indications more in detail or more simply.

Setting procedures for the wireless LAN according to this embodiment of the present invention are formed in order of network selection security setting and security designation. Thus, it is possible to skip or omit the procedures by selecting presence or absence of setting. Therefore, it is possible to complete the setting without performing useless scroll and designation operation of the setting screens.

During setting, it is possible to prevent setting mistakes due to misoperation by dimly displaying buttons unnecessary to be operated on a screen to disallow the user to select the buttons.

As explained above, according to this embodiment, the user can easily and properly perform setting in accordance with the procedures by the program in which the setting items of the wireless LAN are created in advance even if the user does not have high degree of background knowledge.

What is claimed is:

1. A wireless LAN setting system mounted on an image forming apparatus that performs network connection through a wireless LAN and used for performing wireless communication with plural terminals, the wireless LAN system comprising:

an existing setting check mode for checking, prior to performing wireless LAN setting, contents already set in the image forming apparatus;

a network type selection mode for selecting a network used for the wireless communication;

an SSID setting mode for establishing a predetermined protocol between the image forming apparatus and the plural terminals in the wireless communication;

a security mode for applying encoding to information to be communicated and performing wireless communication using a selected encryption system; and a display unit configured to switch and display a setting screen according to selection of the respective modes, wherein the existing setting check mode, the network type selection mode, the SSID setting mode, and the security mode are established by a program including information on the setting screen used for setting operation and stored in a storing unit provided in the image forming apparatus, and the setting screen used for setting operation is attached with a guide indication representing operation necessary for setting.

2. A wireless LAN setting system according to claim 1, wherein, in the setting screen used for setting operation, buttons unnecessary to be operated on screens of the respective modes are dimly displayed to invalidate selection of the buttons.

3. A wireless LAN setting system according to claim 1, wherein, in the existing setting check mode, the network type selection mode, the SSID setting mode, and the security mode, presence or absence of setting is selected to skip setting operation in the other modes.

4. A wireless LAN setting system according to claim 1, wherein, in the existing setting check mode, setting states of use or nonuse of wireless LAN communication, use or nonuse of network type security, a type of information encryption, transmission power, and a transmission rate are presented.

5. A wireless LAN setting system according to claim 1, wherein the security mode is formed by six function modes, i.e., WPA, WPA2, WPAPSK, WPAPSK2, (IEEE)802.1X, and WEP and at least one of the function modes is selected.

6. A wireless LAN setting system according to claim 1, wherein, in the SSID setting mode, a table for registering plural SSIDs is provided and an SSID in the table is selected, whereby the SSID is set.

7. An image forming apparatus mounted with the wireless LAN setting system according to claim 1, comprising:
   an image forming unit configured to form an image, a character, and the like on a recording medium;
   a communication input and output unit configured to be connected to a network including a telephone line and an optical cable line;
   a storing unit configured to store image data, various kinds of setting information, a program for recording operation and control, and a program used for setting operation in the wireless LAN setting system;
   an input unit configured to input setting registration and indication by a user;
   a control unit configured to indicate control of components of the entire apparatus and setting of the wireless LAN; and
   a transmitting and receiving unit for performing wireless communication and optical communication, wherein the image forming apparatus performs wireless LAN communication between the transmitting and receiving unit and plural terminals via a wireless access point.

8. A wireless LAN setting method with which an image forming apparatus, which performs network connection through a wireless LAN, performs wireless communication with plural terminals, the wireless LAN setting method comprising:
   switching to display a setting screen in setting of the wireless LAN;
   checking, prior to performing wireless LAN setting, contents already set in the image forming apparatus;
   setting a network type selection mode for selecting a network used for the wireless communication;
   setting an SSID setting mode for establishing a predetermined protocol between the image forming apparatus and the plural terminals in the wireless communication;
   setting a security mode for applying encoding to information to be communicated and performing wireless communication using a selected encryption system; and
   setting operation for the check of existing setting, the selection of a network type, the setting of an SSID, and the setting of security is performed in accordance with a program including information on the setting screen stored in a storing unit provided in the image forming apparatus, wherein operation necessary for setting is performed in accordance with a guide indication displayed on the setting screen.

9. A wireless LAN setting method according to claim 8, wherein, in the setting, a button unnecessary to be operated is dimply displayed in the guide indication displayed on the setting screen.

10. A wireless LAN setting method according to claim 8, wherein, in the check of existing setting, the selection of a network type, the setting of an SSID, and the setting of security, setting operation for the other modes is skipped by selecting presence or absence of setting.

11. A wireless LAN setting method according to claim 8, wherein, setting states of the check of existing setting, use or nonuse of the wireless LAN communication, a network type, an SSID, use or nonuse of security, a type of information encryption, transmission power, and a transmission rate are displayed on the setting screen.

12. A wireless LAN setting method according to claim 8, wherein, in the setting of security, at least one function mode is selected out of six function modes, i.e., WPA, WPA2, WPAPSK, WPAPSK2, (IEEE)802.1X, and WEP and set.

13. A wireless LAN setting system according to claim 8, wherein, in the setting of an SSID, at least one SSID is selected from a table for registering plural SSIDs and set.

* * * * *